Oct. 20, 1964  G. L. N. MEYER  3,153,478
AIR MODULATED DRIVE MEANS
Filed April 30, 1962  7 Sheets-Sheet 3

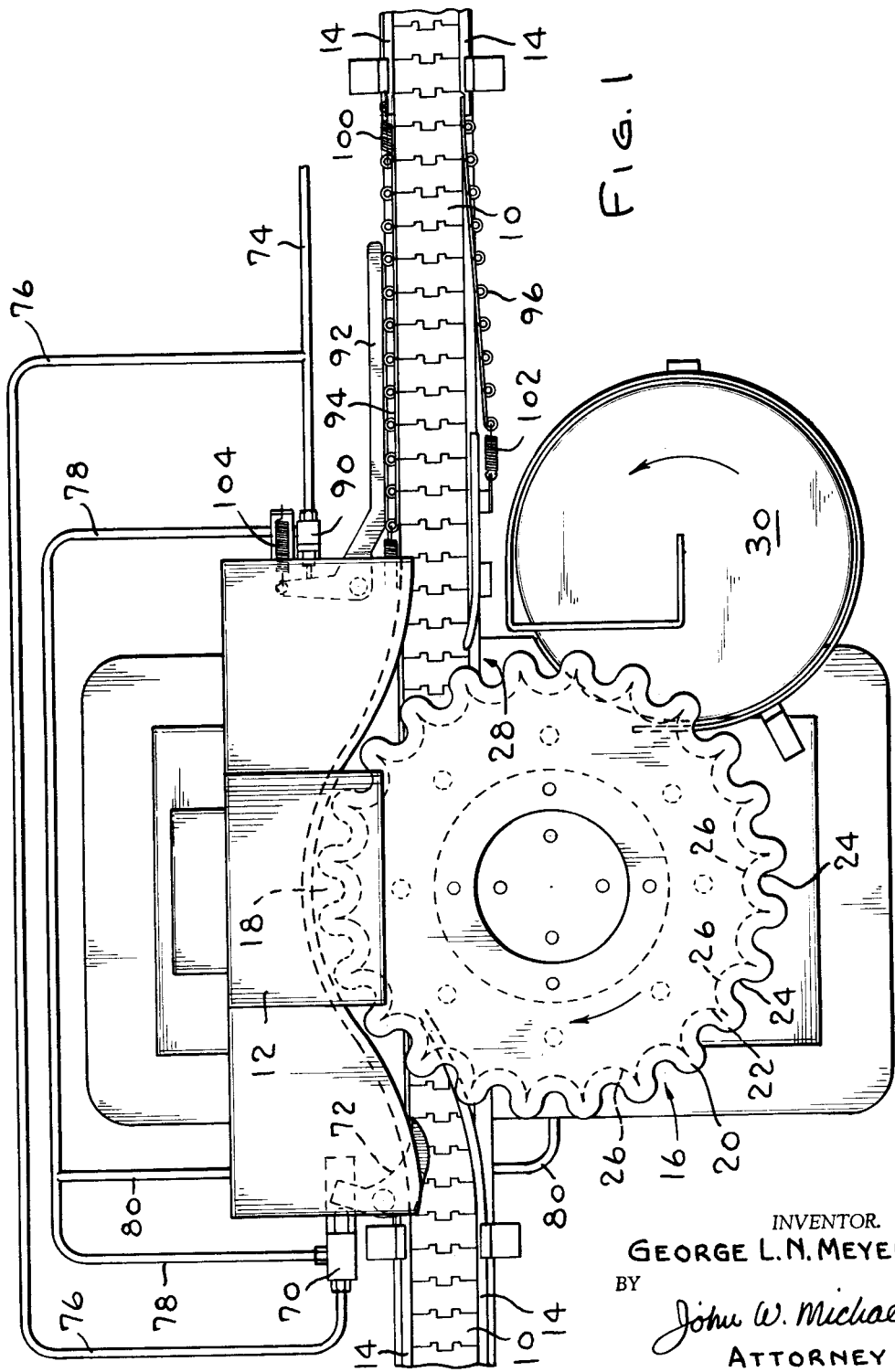

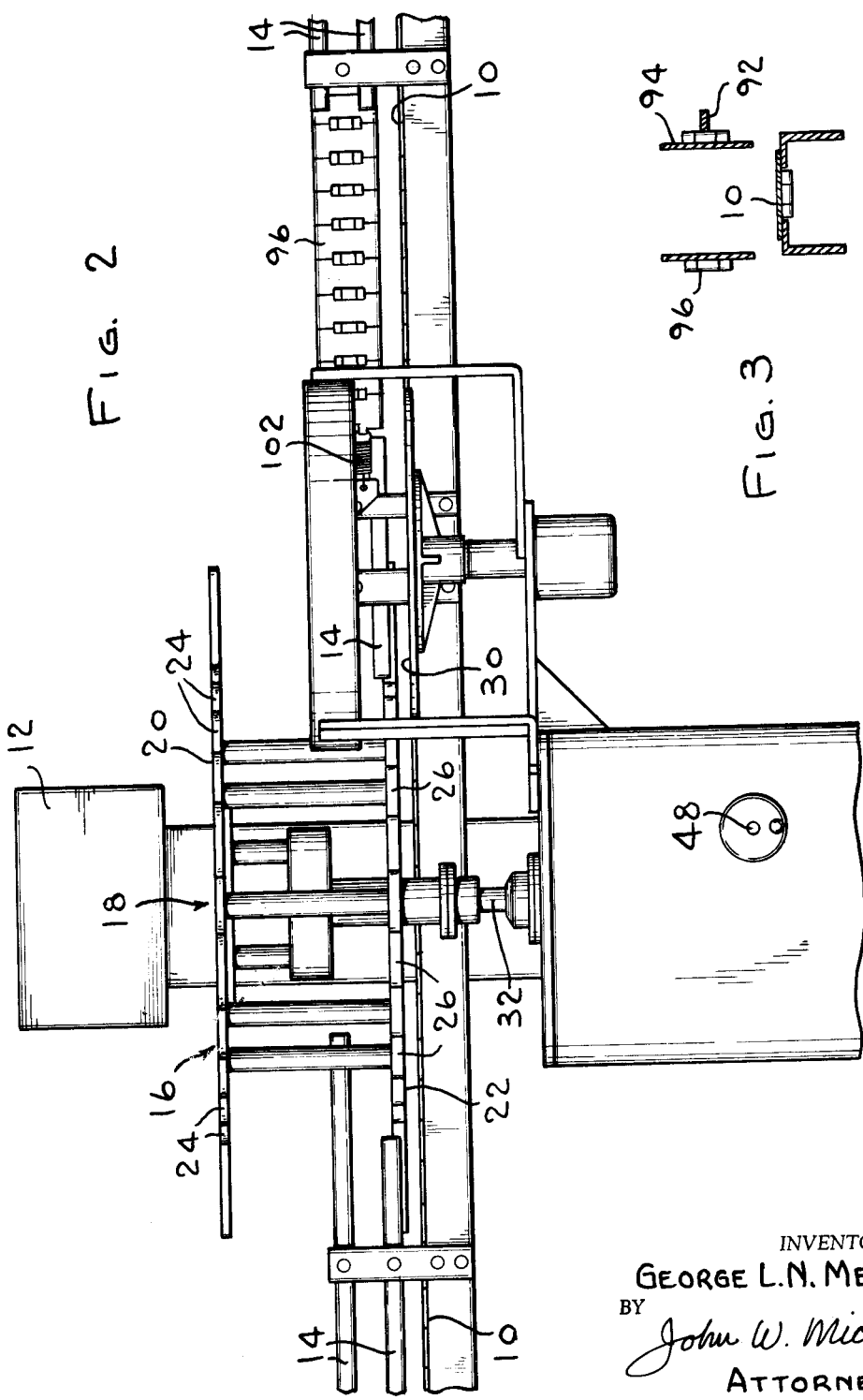

INVENTOR.
GEORGE L. N. MEYER
BY John W. Michael
ATTORNEY

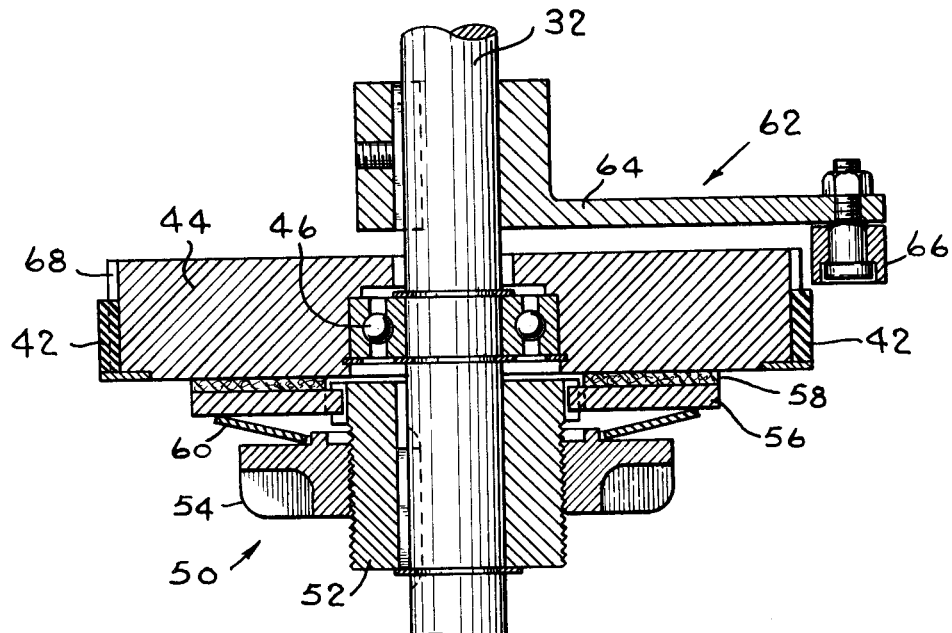
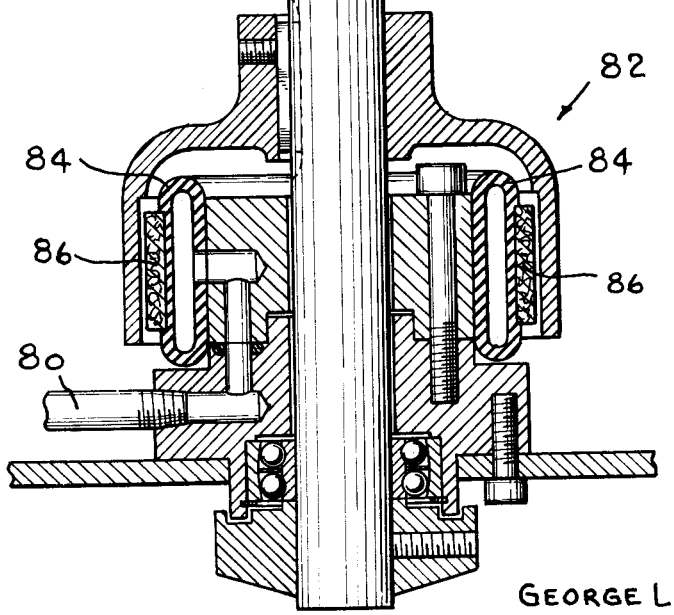
Fig. 5

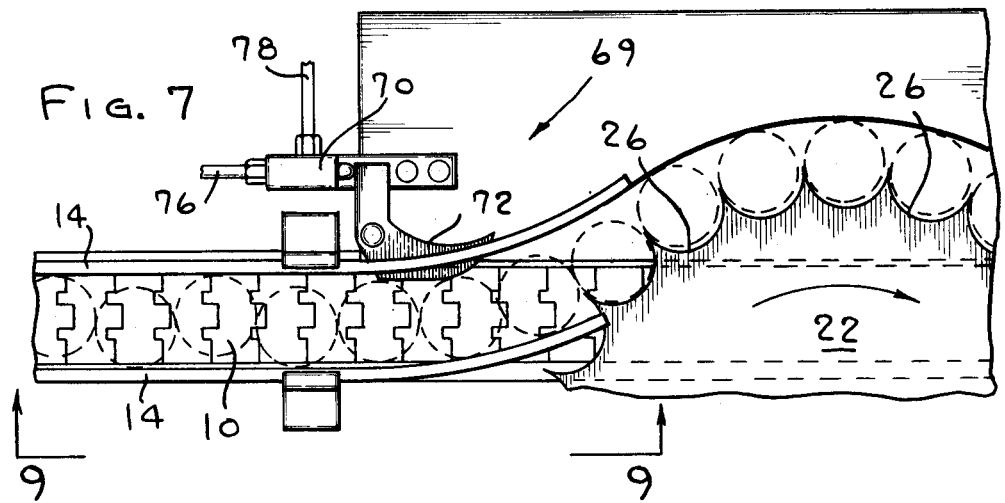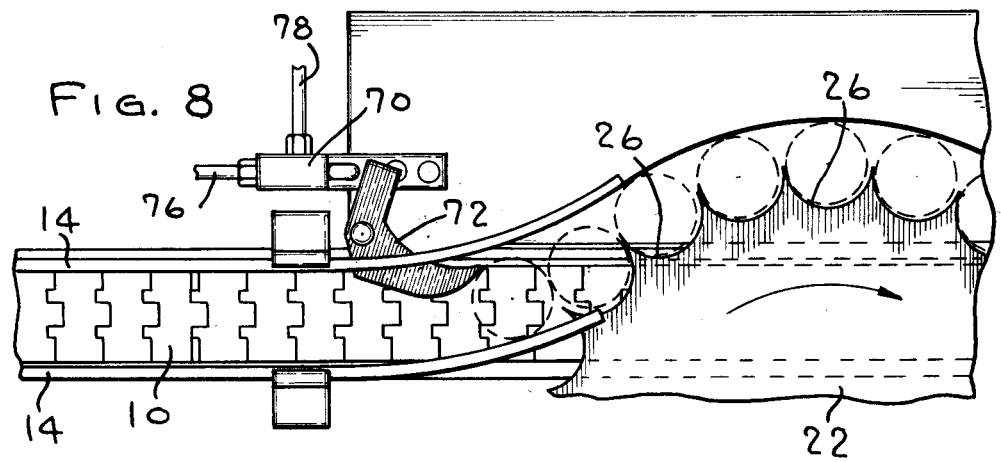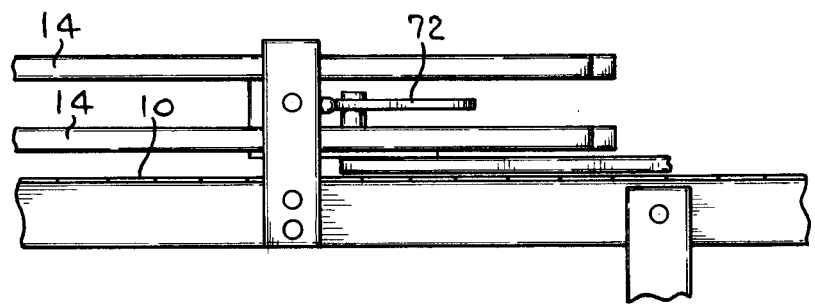

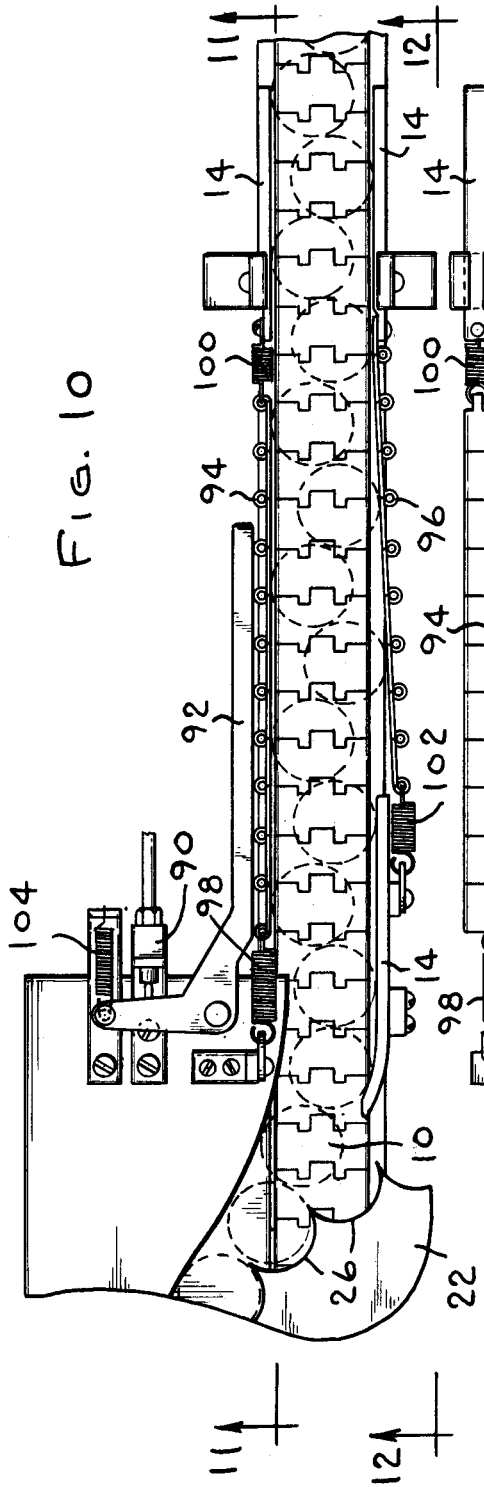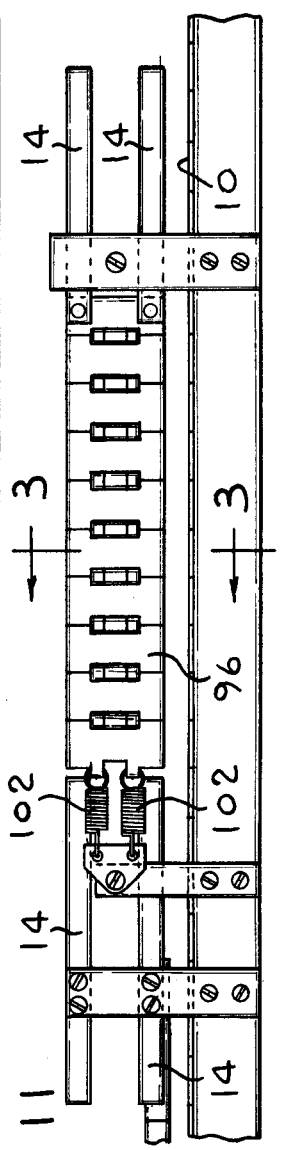

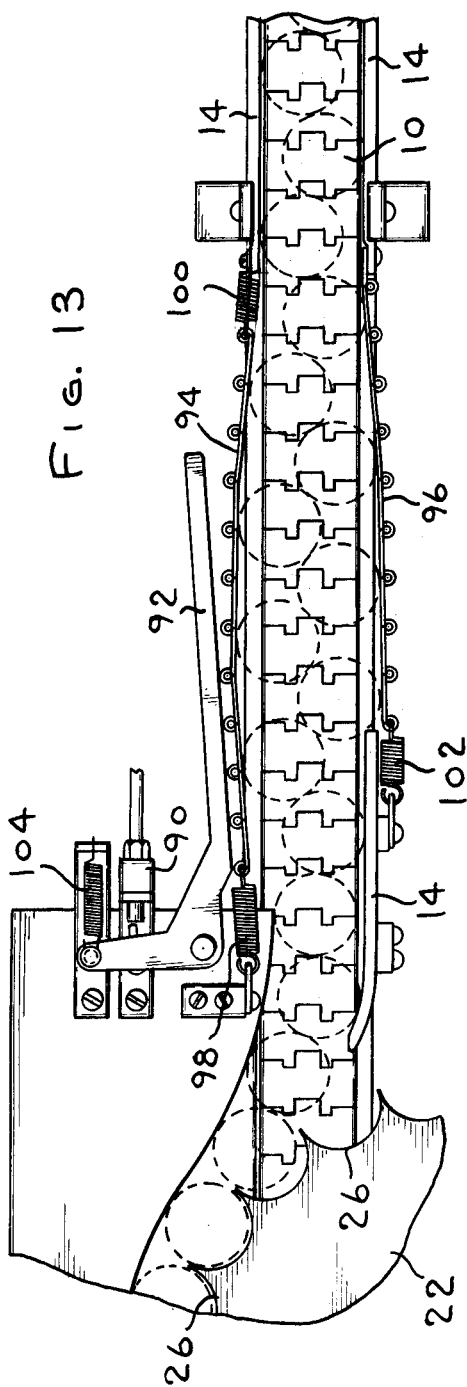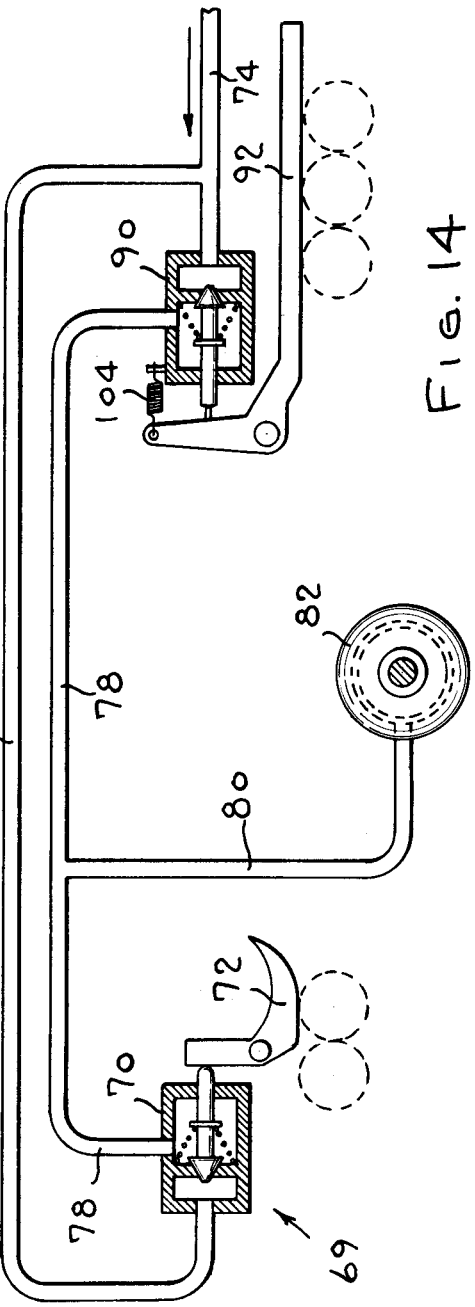

United States Patent Office 3,153,478
Patented Oct. 20, 1964

1

3,153,478
AIR MODULATED DRIVE MEANS
George L. N. Meyer, Milwaukee, Wis., assignor to Geo.
J. Meyer Manufacturing Co., Cudahy, Wis., a corporation of Wisconsin
Filed Apr. 30, 1962, Ser. No. 191,179
12 Claims. (Cl. 198—209)

This invention relates generally to a motor drive and control means and more particularly to a motor drive and control for a bottle inspection apparatus adapted for inspecting bottles carried on a conveyor from a bottle cleaner to a bottle filler.

Due to the inherent design characteristics of a bottle cleaner and the desirability of providing a constant flow of bottles into the filler, it is necessary in apparatus of this type that the bottle handling capacity of the conveyor exceeds both the output of the washer and the input capacity of the filler. Under normal operating conditions involving only a bottle cleaner and filler, the input capacity of the filler is set slightly higher than the output of the cleaner to prevent excessive back-accumulation at the filler due to the greater capacity of the conveyor. Some back-accumulation is desirable, however, to insure a constant supply of bottles at the filler.

The interposing of a third machine such as a bottle inspector in the conveyor line between the bottle cleaner and filler creates several difficult problems. One major problem involves the synchronization of the bottle flow into the inspector with the rotation of the inspector indexing member and the maintenance of a substantially constant flow of bottles through the inspector. The inspector employs a rotatable indexing member such as a starwheel turret to carry the bottles in an arcuate path from the conveyor through the inspection station and then back onto the conveyor (if not rejected). Unless the rotation of the turret and the inflow of bottles is properly synchronized, jamming and clashing will occur as the bottles are engaged by the turret. The problem is particularly difficult due to frequent irregularities in the bottle flow from the cleaner. Furthermore, due to variations in the momentum of the bottles at the turret the variable torque produced at the turret by the bottle flow will tend to cause a variable inspector throughput to the filler. A further consideration is the maintenance of a minimum turret speed to facilitate proper bottle inspection. A maximum turret speed must also be maintained to prevent excessive back-accumulation at the filler. It is one object of this invention, therefore, to provide a means for automatically maintaining synchronization between the turret and the flow of bottles into the inspector and for providing a substantially constant flow of bottles through the inspector irrespective of variations in the momentum of the bottles at the turret.

A further object is to provide the above characteristics without allowing the turret to exceed a predetermined maximum speed while at the same time preventing creepage of bottles through the inspector at speeds below that necessary to maintain proper inspection.

Another problem results from the back-accumulation of bottles at the filler which, as stated above, is desirable to some degree to keep the filler supplied with a constant supply of bottles. Such back-accumulation, however, if not properly controlled will throttle the inspector outfeed causing the excessive bottle pressure created thereat to seek relief by the ejection of clean bottles from the inspector in a manner normally reserved for the rejection of dirty bottles. This problem of back-accumulation becomes more and more critical the closer the inspector is positioned to the filler. On the other hand, it will be readily appreciated that it is always desirable and often

2 essential that the amount of floor space utilized be kept to a minimum. Furthermore, by locating the inspector and filler in close proximity, a single operator can more easily and effectively handle both machines. With the above considerations in mind, a second important objective of this invention is to provide a means for automatically controlling back-accumulation at the filler to thus prevent throttling the inspector outfeed, even where the inspector and filler are located relatively close together.

Other objects and advantages will be pointed out in, or be apparent from the specification and claims, as will obvious modifications of the single embodiment shown in the drawings, in which:

FIG. 1 is a top plan view of an inspector and conveyor arrangement embodying the present invention;

FIG. 2 is a side elevation view of the apparatus shown in FIG. 1;

FIG. 3 is a sectional view taken along line 3—3 of FIG. 2;

FIG. 5 is a sectional view taken along line 5—5 of FIG. 4;

FIGS. 7 and 8 are fragmentary top plan views of the inspector and conveyor arrangement showing the infeed control apparatus for the inspector drive means;

FIG. 9 is a fragmentary elevation view taken along line 9—9 of FIG. 7;

FIGS. 10 and 13 are fragmentary top plan views of the inspector and conveyor arrangement showing the back-accumulation control apparatus at the outfeed of the inspector;

FIG. 11 is a sectional view taken along line 11—11 of FIG. 10;

FIG. 12 is a partial side elevation view taken along line 12—12 of FIG. 10; and

FIG. 14 is a partially schematic layout of the fluid pressure arrangement for operating the turret brake under the control of the infeed and back-accumulation control means.

Figure 4:
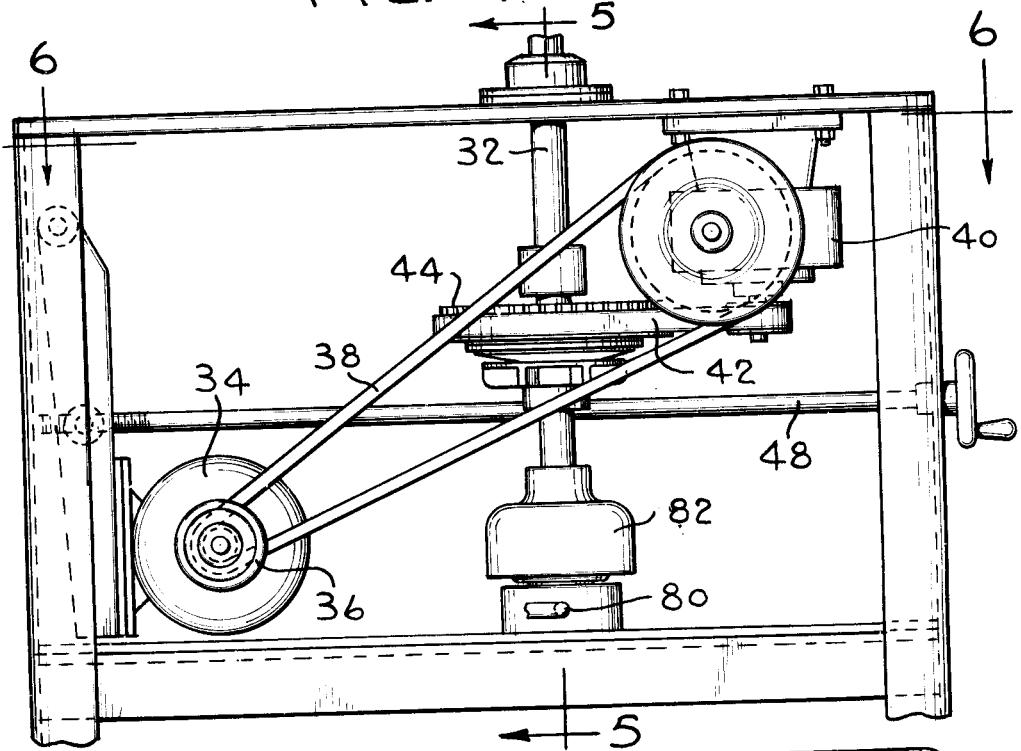
FIG. 4 is a partial side elevation view of the inspector showing the drive and control apparatus therefor.

Referring now to the drawings in detail, FIG. 1 shows a conveyor 10 adapted to carry bottles or other containers from left to right from a bottle washer (not shown) to an inspection apparatus 12 and then from the inspector to a bottle filler (not shown). Conveyor 10 is provided with guide rails 14 adapted to direct the flow of bottles in a linear path to and from inspector 12.

Inspector 12 includes a rotatable indexing member or turret 16 designed to carry bottles in an arcuate path from the conveyor through an inspection station 18 and then back onto the conveyor (if not rejected) for continued travel to the filler. The specific design of turret 16 will depend largely on the size and shape of the bottles to be handled. In the disclosed embodiment, turret 16 is comprised of a pair of interconnected starwheel plates 20 and 22 having peripheral notches 24 and 26, respectively, designed to engage the neck and base of a bottle and carry it in an arcuate path through the inspection station 18.

The dirty bottles are ejected from the conveyor at the outfeed of the turret through a reject exit 28 onto a rotating reject table 30. The particular inspection apparatus employed for detecting dirty bottles may be of any suitable type such as that disclosed in copending application Serial No. 808,172, filed April 22, 1959, now Patent No. 3,081,666, and assigned to the assignee of this application.

Turret 16 is mounted on a vertical drive shaft 32 driven by a drive arrangement which includes a constant speed motor 34 mounted beneath the turret (FIG. 4) and adapted to drive shaft 32 in a clockwise direction (as viewed in FIG. 1).

The turret is normally fed by a complement of bottles carried to the inspector by conveyor 10. The turret may be likened to a gear, the tooth spacing (notches 24, 26) of which corresponds to a pitch approximately that of the diameter of the bottles which the turret is designed to carry. A bottle-to-bottle flow pattern of bottles is analogous to the straight-line tooth pattern of a gear rack. It follows, that if the spacing of the bottles on the conveyor is the same as the spacing of the notches on the turret, the turret will engage properly and smoothly with the incoming flow of bottles. If, for any reason, the bottle spacing varies from that of the notches on the turret, synchronism between the two will be lost and clashing or jamming will result.

Various arrangements and designs have been tried in an effort to provide a system which will maintain synchronism and at the same time provide the proper bottle flow for inspection. Theoretically, if the turret were made to operate freewheeling as a function of the turning effort imparted by the flow of bottles on the conveyor, each bottle would seek its pocket in the turret and if no bottles were present the turret would not turn and therefore would be in proper position to accept the next incoming bottle without danger of jamming or failure to properly mesh. An inherent limitation in such an arrangement, however, is the fact that the turning effort required by the turret is not at all times consistent with the turning effort imparted by the flow of bottles on the conveyor due to the fact that the momentum of bottle flow, as pointed out previously, is not constant, thus giving rise to a variable pressure at the turret resulting in a variable turning effort or torque imparted to the turret. The problem is further complicated by the fact that the inspection apparatus 12 will generally require bottle translation speeds of a specific minimum value below which the inspector will not operate properly. Thus, the very slow bottle speeds sometimes encountered in a pure "freewheeling" arrangement are objectionable in that improper inspection results.

Figure 6:
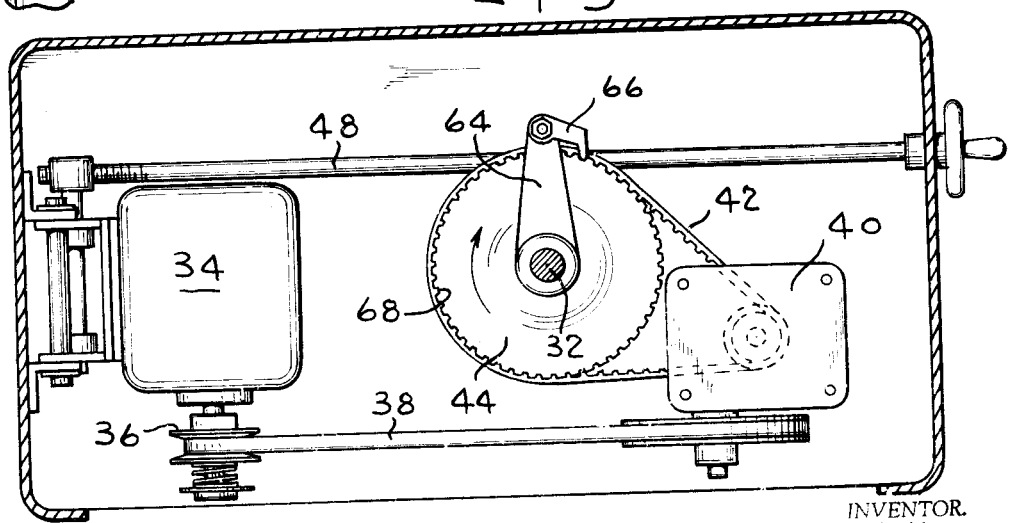
FIG. 6 is a sectional view taken along line 6—6 of FIG. 4.

To overcome the problems described above, a drive and control arrangement is provided which includes a motor drive adapted to provide a supplemental torque in addition to that developed by the incoming bottles. As shown in FIGS. 5 and 6, such supplemental torque is provided by a constant speed motor 34 in driving engagement with shaft 32 by means of a variable speed drive arrangement of conventional design comprising a variable pitch pulley 36, V-belt drive 38, gear reducer 40 and timing belt 42 which drives a timing gear 44 freely rotatably mounted on shaft 32 by ball bearing assembly 46 (FIG. 5). The speed at which timing gear 44 is driven by motor 34 is controlled by means of rod assembly 48 which when actuated will move the motor 34 to thereby vary the effective diameter of pulley 36.

The maximum amount of torque imparted to shaft 32 by motor 34 can be set by an adjustable torque limiting clutch arrangement 50 (FIG. 5) mounted on shaft 32. Clutch 50 includes a hub 52 keyed to shaft 32 and an adjustable collar 54 threaded on the hub. Rotation of collar 54 on hub 52 will vary the force with which pressure plate 56 is urged into contact with clutch face 58 on the gear 44 by spring member 60.

Thus it is seen that the total torque imparted to shaft 32 will be the sum of the substantially constant torque value provided by motor 34 plus the varying torque produced by the bottles. If, for any reason, bottle inflow pressure drops off the motor will tend to keep the turret turning at a sufficient minimum speed to maintain proper operation of the inspection apparatus 12. On the other hand to control maximum turret speed in a situation where bottle inflow pressure is high, a speed limiting pawl and ratchet arrangement 62 (FIG. 6) is provided. Such arrangement includes an arm 64 keyed to shaft 32 and having a spring biased pawl 66 mounted on the end thereof for unidirectional engagement with ratchet teeth 68 on timing gear 44. As stated previously, motor 34 runs at a constant speed and will drive timing gear 44 at a constant speed. Thus, if the bottle inflow pressure at the turret reaches a value where the turning effort imparted to the turret tends to drive it at a speed which exceeds that of timing gear 44, pawl 66 will engage ratchet teeth 68 and prevent the turret speed from exceeding that of the timing gear. The turning effort imparted to gear 44 by the shaft will not cause the gear to speed up due to the friction and inertia of gear box 40. Thus, the constant speed drive for gear 44 in conjunction with pawl and ratchet arrangement 62 effectively cooperate to limit the maximum speed of turret 16.

To insure proper synchronization between bottle flow and turret rotation an infeed control arrangement 69 is provided (FIGS. 7, 8 and 14). Such arrangement includes a normally open fluid valve 70 and a bottle sensing actuator member 72 mounted upstream of inspector 12. Actuator arm 72 is designed to sense the presence or absence of incoming bottles on the conveyor. As shown in FIGS. 7, 8 and 14, in the absence of bottles at arm 72 on the conveyor, valve 70 will open allowing fluid pressure to flow from supply conduit 74 through conduit 76, valve 70, conduits 78 and 80 to a fluid pressure responsive brake 82 mounted on turret shaft 32. Brake 82 (FIG. 5) is comprised of an expandable boot 84 fixedly mounted with respect to shaft 32 and adapted when pressurized to force a pressure band 86 into contact with a hood member 88 keyed to shaft 32 to thereby apply a braking force to the shaft.

Thus, as shown in FIG. 7, with a steady flow of bottles on conveyor 10 at arm 72, valve 70 will be held closed and brake 82 will be deenergized allowing shaft 32 to be driven freely by the combined torque supplied by motor 34 and the bottle inflow pressure at the turret. If, for any reason, an interruption in bottle flow occurs, valve 70 will open when the last bottle before the gap passes arm 72 (FIG. 8). The opening of valve 70 will set brake 82 causing the turret to stop and be held stationary until the valve is closed by a new complement of bottles arriving at arm 72 on conveyor 10. It is noted that when the brake is set (FIG. 8) the notches of turret 16 and the conveyor between arm 72 and inspection station 18 are fully occupied by bottles. Thus, when a new complement of bottles arrives at arm 72 to close valve 70 and release brake 82 there is no problem of synchronization between bottles and turret upon turret start-up because the turret was never devoid of bottles during the stoppage. In this regard it is important that torque limiting clutch 50 be adjusted to provide the proper operation of infeed control valve 70. It will be appreciated that when a gap in infeed bottle flow occurs the bottle pressure at the turret will decrease steadily as the gap approaches arm 72. Clutch 50 is set so that the torque provided by motor 34 will be sufficient to keep the turret rotating until the gap reaches arm 72 causing the brake to set. This is important since if the turret were to stop before arm 72 is released (by a gap in bottle flow) there would be a tendency for the bottles in the turret to creep slowly past inspection station 18 resulting in improper inspection of those bottles which pass at below the minimum required speed.

Finally, it should be noted that upon start-up of turret 16 is is important that a minimum turret speed be established in a very short period of time so that the first bottles to pass station 18 after start-up will be properly inspected. The desired acceleration of turret 16 is aided by the torque supplied by motor 34 and here again the adjustment of clutch 50 will have an effect on such acceleration.

As stated previously, the interposition of inspector 12 between the bottle cleaner and the filler screw of the filler creates a problem with respect to the normal back-accumulation of bottles at the filler. If bottles are allowed to accumulate from the filler back to the reject exit 28 at the inspector outfeed, clean bottles will be forced through exit 28 onto reject table 30. As explained previously, the rated speed of bottle flow through the inspector is dependent on the turning effort developed by the flow of bottles themselves plus the torque supplied by the motor 34. By providing an automatically controlled means 89 for reducing the speed of the turret, the rate of flow can be slowed down when necessary to prevent excessive back-accumulation.

Such automatic control means 89 in shown in FIGS. 10, 11, 12, 13 and 14 and includes a modulating control valve 90 mounted at the inspector outfeed. Valve 90 is normally closed and is modulated between open and closed positions by an elongated modulating arm 92 pivotally mounted adjacent conveyor 10 as shown in FIGS. 10 and 13. Arm 92 is actuated in response to back-accumulation by means of flexible bottle guide members 94 and 96 resiliently mounted on either side of conveyor 10 adjacent arm 92 by springs 98, 100 and 102 (FIG. 13).

As a natural characteristic of back-accumulation the bottles will assume a staggered or offset flow pattern in contrast with the normal linear flow pattern of a freely flowing line of bottles. This staggered or offset pattern will tend to cause the bottles to fill the space between guide members 94, 96 causing member 94 to bulge outwardly and thereby react on modulating arm 92 as shown in FIG. 13. Actuation of arm 92 will cause modulating control valve 90 to start to open which in turn will allow air to flow from supply conduit 74 through valve 90 and then through conduits 78 and 80 to brake 82. The introduction of fluid pressure to boot 84 of brake 82 will force brake band 86 into contact with hood 88 producing a braking action at shaft 32. Such braking action will slow down the rotation of turret 16 to thereby restrict the flow of bottles to the conveyor downstream of the inspector and thus relieve back-accumulation. As shown in FIG. 10, as back-accumulation begins, arm 92 will be actuated to open valve 90 which in turn will increase fluid pressure in expandable boot 84 to apply a braking action to shaft 32. As back-accumulation increases in severity (FIG. 13), the braking action at shaft 32 will be correspondingly increased until valve 90 is completely opened causing the brake to completely stop turret 16. It should be noted at this point that when turret speed is slowed by brake 82 in response to back-accumulation, timing gear 44 on shaft 32 will continue to be driven at a constant speed by motor 34. The difference in speed between gear 44 and shaft 32 will result in slippage at clutch means 50.

When the bottle pressure due to back-accumulation is sufficiently relieved to allow the bottles to reassume a perfectly linear flow pattern, guide member 94 straightens out, arm 92 is returned by spring 104, and valve 90 is again closed to deenergize brake 82 and again allow turret 16 to resume its normal speed in response to the torque supplied by motor 34 and the incoming bottle flow.

In the preferred embodiment described above, springs 98 and 100 of member 94 are not as strong as spring 102 of member 96. Thus, member 94 will be the first to bulge outwardly when back-accumulation occurs. It should be noted at this point that only a single flexible guide member 94 is required to sense back-accumulation and actuate arm 92. The second guide member 96 is provided to allow for a greater degree of back-accumulation than would otherwise be the case.

*Operation*

A typical operation of the above described inspector drive means is as follows.

With a steady flow of bottles from the washer to inspector 12 on conveyor 10, fluid valve 70 will be held closed by arm 72 to maintain brake 82 deenergized and allow turret 16 to be driven freely by the combined torque supplied by motor 34 and the bottle inflow pressure at the turret.

The maximum amount of torque imparted to shaft 32 by motor 34 can be set by an adjustable torque limiting clutch 50. If, for any reason such as a bottle gap, bottle inflow pressure drops off the motor will tend to keep the turret turning at a sufficient minimum speed to maintain proper operation of inspector 12. On the other hand to control maximum turret speed in a situation where bottle inflow pressure is high, a speed limiting pawl and ratchet arrangement 62 is provided.

If, for any reason, an interruption in bottle flow occurs, valve 70 will open when the last bottle before the gap passes arm 72. The opening of valve 70 will set brake 82 causing the turret to stop and be held stationary until the valve is again closed by a new complement of bottles arriving at arm 72.

The automatically controlled means for reducing turret speed in response to back-accumulation at the inspector outfeed includes a modulating control valve 90 actuated by a modulating arm 92 pivotally mounted adjacent a resiliently flexible guide rail member 94. The staggered or offset pattern of bottles which results from a back-accumulation will tend to cause the bottles to fill the area adjacent member 94 causing such member to bulge outwardly against arm 92. Movement of arm 92 will cause an increasingly greater fluid pressure to be exerted at brake 82 which in turn will apply a corresponding braking action to the turret. Thus, as the severity of back-accumulation increases at arm 92 the amount of braking action at the turret shaft will also be increased until the turret is completely stopped. As back-accumulation is reduced the braking action will fall off allowing the turret to resume normal speed.

Although but one embodiment of the present invention has been illustrated and described, it will be apparent to those skilled in the art that various changes and modifications may be made therein without departing from the spirit of the invention or from the scope of the appended claims.

I claim:
1. Drive and control apparatus for the turret of a bottle inspector adapted to handle a flow of bottles on a conveyor comprising, a constant speed drive means for the turret, brake means for applying a braking action to said turret, infeed control means for said brake means adapted to sense a gap in the flow of bottles on the conveyor upstream of the inspector and to energize the brake to stop the turret when such a gap occurs, and slip clutch means between said drive means and the turret to permit said drive means to run continuously even during periods when said brake means is applied.

2. Drive and control apparatus according to claim 1 in which said slip clutch means is adjustable and is set so that the torque transmitted thereby from said constant speed drive means to the turret is sufficient to maintain turret rotation until a gap in the bottle flow is sensed by said infeed control means.

3. Drive and control apparatus according to claim 1 in which said infeed control means includes an infeed bottle sensing member movably mounted upstream of the turret and a fluid pressure valve adapted for actuation by said infeed sensing member, said fluid pressure valve adapted when actuated to energize and deenergize said brake means.

4. Drive and control apparatus for the turret of a bottle inspector adapted to handle a flow of bottles on a conveyor comprising, a constant speed drive means for the turret, brake means for applying a braking action to said turret, infeed control means for said brake means adapted to sense a gap in the flow of bottles on the conveyor upstream of the inspector and to energize the brake to stop the turret when such a gap occurs, a maximum speed control means for said turret adapted to prevent said turret from exceeding the speed of said drive means, and slip clutch means between said drive means and the turret to permit said drive means to run continuously even during periods when said brake means is applied.

5. Drive and control apparatus according to claim 4 in which said speed control means includes a timing gear freely rotatably mounted with respect to the turret, and an arm member operatively connected to said turret and in unidirectional engagement with said timing gear.

6. Drive and control apparatus according to claim 5 in which said infeed control means includes an infeed bottle sensing member movably mounted upstream of the turret and a fluid pressure valve adapted for actuating by said infeed sensing member, said fluid pressure valve adapted when actuated to energize and deenergize said brake means.

7. Drive and control apparatus for the turret of a bottle inspector adapted to handle a flow of bottles on a conveyor comprising, a constant speed drive means for the turret, brake means for applying a braking action to said turret, infeed control means for said brake means adapted to sense a gap in the flow of bottles on the conveyor upstream of the inspector and to energize the brake to stop the turret when such a gap occurs, a maximum speed control means for said turret adapted to prevent said turret from exceeding the speed of said drive means, back-accumulation control means operative in response to back-accumulation at the inspector outfeed, said back-accumulation control means adapted to modulate the braking action exerted on the turret by said brake means to thereby modulate the speed of said turret in accordance with the degree of back-accumulation, and slip clutch means between said drive means and the turret to permit said drive means to run continuously even during periods when said brake means is applied.

8. Drive and control apparatus according to claim 7 in which said back-accumulation control means includes a modulating arm adapted to sense back-accumulation of bottles on the conveyor downstream of the turret and a modulating control instrumentality actuated by said arm and adapted to modulate the turret speed in response to actuation by said modulating arm.

9. Drive and control apparatus according to claim 8 in which said back-accumulation control means further includes a bottle guide member movably mounted adjacent the conveyor and adapted to sense a staggered or offset flow pattern of bottles on the conveyor.

10. Drive and control apparatus for the turret of a bottle inspector adapted to handle a flow of bottles on a conveyor comprising, drive means for the turret, and back-accumulation control means operative in response to back-accumulation at the inspector outfeed and adapted to modulate the speed of said turret to thereby reduce bottle throughput at the inspector upon the occurrence of such back-accumulation, said back-accumulation control means including a modulating arm adapted to sense back-accumulation of bottles on the conveyor downstream of the turret and a modulating control instrumentality actuated by said arm and adapted to modulate turret speed in response to actuation by said modulating arm, said back-accumulation control means further including a bottle guide member movably mounted adjacent the conveyor and adapted to sense a staggered or offset flow pattern of bottles on the conveyor, said bottle guide member adapted to actuate said modulating arm when a staggered or offset flow pattern of bottles on the conveyor occurs, said back-accumulation control means further including a brake means for said turret under control of said control instrumentality and adapted to vary the speed of the turret in response to movement of said bottle guide member and said modulating arm.

11. Drive and control apparatus for the turret of a bottle inspector adapted to handle a flow of bottles on a conveyor comprising, a constant speed drive means for the turret, and maximum speed control means for said turret adapted to prevent said turret from exceeding the speed of said constant speed drive means, said maximum speed control means including a timing gear having ratchet teeth thereon freely rotatably mounted with respect to the turret, an arm member operatively connected to said turret, and a pawl member pivotally mounted on said arm member, said pawl member adapted for unidirectional engagement with said ratchet teeth on said timing gear.

12. Drive and control apparatus for the turret of a bottle inspector adapted to handle a flow of bottles on a conveyor comprising, a constant speed drive means for the turret, brake means for applying a braking action to said turret, infeed control means for said brake means adapted to sense a gap in the flow of bottles on the conveyor upstream of the inspector and to energize the brake to stop the turret when such a gap occurs, and a maximum speed control means for said turret adapted to prevent said turret for exceeding the speed of said drive means.

References Cited in the file of this patent
UNITED STATES PATENTS

| 1,530,478 | Carlson | Mar. 24, 1925 |
| 1,862,485 | McEwan | June 7, 1932 |
| 2,013,144 | Gladfelter | Sept. 3, 1935 |
| 2,277,554 | McCoy | Mar. 24, 1942 |
| 2,353,127 | Davis | July 11, 1944 |

UNITED STATES PATENT OFFICE
CERTIFICATE OF CORRECTION

Patent No. 3,153,478                  October 20, 1964

George L. N. Meyer

It is hereby certified that error appears in the above numbered patent requiring correction and that the said Letters Patent should read as corrected below.

Column 8, line 42, for "for" read -- from --.

Signed and sealed this 2nd day of February 1965.

(SEAL)
Attest:

ERNEST W. SWIDER
Attesting Officer

EDWARD J. BRENNER
Commissioner of Patents